(12) United States Patent
Lewellin

(10) Patent No.: US 8,372,324 B2
(45) Date of Patent: Feb. 12, 2013

(54) BINDING OF PARTICULATE MATERIALS TO MANUFACTURE ARTICLES

(75) Inventor: Richard Laurance Lewellin, Somerville (AU)

(73) Assignee: Panel Board Holding B.V. (NL)

( * ) Notice: Subject to any disclaimer, the term of this patent is extended or adjusted under 35 U.S.C. 154(b) by 0 days.

(21) Appl. No.: 12/993,811

(22) PCT Filed: May 25, 2009

(86) PCT No.: PCT/AU2009/000650
§ 371 (c)(1),
(2), (4) Date: Nov. 19, 2010

(87) PCT Pub. No.: WO2009/143562
PCT Pub. Date: Dec. 3, 2009

(65) Prior Publication Data
US 2011/0062636 A1     Mar. 17, 2011

(30) Foreign Application Priority Data
May 26, 2008 (AU) .................. 2008902622

(51) Int. Cl.
*B27N 3/08* (2006.01)
(52) U.S. Cl. .................. 264/109; 264/112; 425/371
(58) Field of Classification Search ................. None
See application file for complete search history.

(56) References Cited

U.S. PATENT DOCUMENTS

| | | | |
|---|---|---|---|
| 3,945,789 A * | 3/1976 | Boman | 425/371 |
| 4,401,615 A | 8/1983 | Gerhardson | |
| 4,420,299 A * | 12/1983 | De Mets | 425/101 |
| 5,130,072 A | 7/1992 | Hemels et al. | |
| 5,454,304 A * | 10/1995 | Bielfeldt | 100/43 |
| 5,776,511 A * | 7/1998 | Miki et al. | 425/115 |
| 5,882,462 A | 3/1999 | Donecker et al. | |
| 5,972,265 A * | 10/1999 | Marra et al. | 264/112 |
| 6,024,905 A | 2/2000 | Doris | |
| 6,074,193 A * | 6/2000 | Kratky et al. | 425/371 |
| 6,080,344 A * | 6/2000 | Thorbjornsson | 264/83 |
| 6,142,068 A * | 11/2000 | Sebastian et al. | 100/154 |
| 6,187,249 B1 | 2/2001 | Lewellin | |
| 2006/0273486 A1 * | 12/2006 | Taylor et al. | 264/166 |

FOREIGN PATENT DOCUMENTS
EP         0074325 A1     3/1983

OTHER PUBLICATIONS
International Search Report of PCT/AU2009/000650 dated Jul. 29, 2009.

* cited by examiner

*Primary Examiner* — Mary F Theisen
(74) *Attorney, Agent, or Firm* — Durham Jones & Pinegar, P.C. Intellectual Property Law Group

(57) ABSTRACT

Methods and apparatus are disclosed for binding of particulate materials to manufacture articles including continuous panels or sheets. Particulate feed materials are mixed with a heat curable binder and the mixture is fed to and compressed in a die. A radio frequency (RF) field is applied across electrodes between which the mixture is held compressed to inductively or dielectrically heat and cure the binder. Prior to entering the die the mixture is first fed to an intake zone where the mixture is shaped into substantially the same shape as the shape of the mixture in the die so that any curing of the binder due to heating of the mixture in the intake zone occurs while the mixture is in the desired final shape. Operating parameters including shape and dimensions of the intake zone, mixture advancement lengths, are disclosed.

28 Claims, 4 Drawing Sheets

BINDING OF PARTICULATE MATERIALS TO MANUFACTURE ARTICLES

CROSS REFERENCE TO RELATED APPLICATION

This is a Convention patent application claiming priority from Australian Patent Application No. 2008902622 filed 26 May 2008, and the contents of that specification are incorporated herein by this cross-reference.

FIELD OF THE INVENTION

This invention relates to the manufacture of bound bodies or articles composed partially of particulate materials, such as bodies in the form of panels, sheets, and other formed shapes and particularly to the manufacturing methods and the products of such methods.

BACKGROUND OF THE INVENTION

In Australian patent specification No. AU-48947/93 (Patent Serial No. 651285) there is described a process for manufacturing bodies composed of a binder mixed with a feed material including rice hulls and/or particles obtained by comminuting rice hulls. The binder comprises a beat curable composition. The mixture of the feed material and binder is formed into the generally desired shape of the body e.g. in a mould or in a press, and the binder is cured to form an adherent body having substantially the required shape, e.g. by applying to the formed shape an RF field of a suitable frequency and intensity and for a suitable period of time to cause dielectric heating within the mixture so as to cure the binder to form the final adherent body. The body is then removed from the mould or press. Reference may be made to this patent specification for further background information particularly in relation to rice hulls and their properties and preparation.

A further patent specification AU-2001100327 by the present applicant further describes processes for forming bodies by extrusion using rice hulls. This patent specification is also incorporated herein in full by cross-reference for the purpose of providing further background information about particulates, fillers, binders, additives, reinforcing, etc that can be used in such bound bodies.

The above references to and descriptions of prior proposals or products and processes are not intended to be, and are not to be construed as, statements or admissions of common general knowledge in the art.

Problems with RF heating and curing, particularly if continuous production of bound bodies is attempted, are outlined later in relation to FIGS. 1 and 2 of the drawings. These figures however do not depict known or published apparatus to the applicant's knowledge, but rather they are used to illustrate difficulties the inventor faced and overcame with the present invention.

SUMMARY OF THE INVENTION

It is an object of the present invention to provide a manufacturing method for producing bound bodies composed at least partially of particulate materials which can provide a useful alternative to known or previously proposed methods.

It is a further and preferred object to overcome the problems with the batch type systems, and to be able to produce a continuous board or panel, or other continuous bound body, using radio frequency (RF) heating.

According to a first aspect of the present invention there is provided a manufacturing method for producing a bound body composed at least partially of particulate material, the method including the steps of:

providing a feed material which includes a substantial proportion of particulate material, introducing to the feed material a binder which includes a heat curable or activated adhesive substance so that the binder contacts significant proportions of the surfaces of the particulate material, feeding the mixture of feed material having the binder therein into a die so that it adopts substantially the shape of the body to be produced, and heating the mixture in the die until the binder has cured sufficiently to enable further handling as an integral bound body comprising the bound particulate materials, wherein the method includes the further step of feeding the mixture through an intake zone prior to entering the die where the mixture is shaped into substantially the same shape it adopts when subsequently fed into the die so that any progress of curing of the binder due to heating the mixture resident in the intake zone is effective in curing the binder while the mixture is in the desired final) shape.

Preferably the mixture of feed material and binder formed into the desired shape is compressed in the die and is resident in a compressed condition in the die for a period of time for the binder to be cured sufficiently to enable removal of the compression and handling of the bound body. The intake zone may be defined by intake guides composed of insulating material. Preferably the intake guides have substantially the same profile and separation as the die so that the die is effectively a continuation of the intake guides whereby mixture within the intake zone feeds smoothly into the die. The die is preferably a continuous extension of the intake zone so that the mixture passes from the intake zone into the die without any intervening transition zone.

In the preferred embodiment the heating may comprise heating by RF energy applied through opposed conductive die plates (electrodes) between which the mixture is located and the intake guides are composed of electrically insulating material. Preferably the length of the intake zone along which the mixture is fed before entering the die is at least equal to the separation of the die plates, and is most preferably in the range of about 2 to 3 times the separation of the die plates, whereby the length of the mixture shaped and resident in the intake zone is substantially equal to or greater than the distance between the die plates. An apparatus according to this embodiment has been successfully trialled with an intake zone length of about three times the distance separating the die plates.

Preferably the mixture is fed into the intake zone through a mouth which has a progressively narrowing shape in the direction of advance of the mixture into the intake zone so that the mixture is progressively compressed as it is fed through the mouth into the intake zone.

The step of feeding preferably comprises feeding the mixture in batches or in an indexed manner from the intake zone into the die so that each indexed batch of mixture in the intake zone is a continuous extension of the preceding batch now in the die and so that the successive formed cured batches that are moved out of the die form a continuous body emerging in a stepped manner. In this method, a leading portion of the batch in the intake zone immediately upstream of the batch in the die and which is subject to at least some heating during heating of the mixture in the die is, upon being advanced into the die, located in the die before the exit of the die so that it is substantially entirely resident in the die for the heating cycle of its batch.

In the preferred method, the longitudinal distance by which the mixture is fed in each batch or indexing movement along the path from the intake zone into the die is less than the longitudinal length of the die in which heating of the mixture occurs, whereby all of the mixture will experience a residence time completely within the longitudinal boundaries of the die.

Preferably the die has side walls which confine the mixture laterally within the die during the heating of the mixture in the die. The side walls of the die may slightly diverge in the direction of advance of the mixture through the die so as to promote the release of the bound body from the die at the end of each operation to cure the binder within the mixture in the die. Alternatively or additionally, the side walls of the die may be movable towards each other to laterally confine the mixture in the die before commencement of the steps of compressing and heating the mixture in the die and may be movable apart to release the bound body formed by curing of the binder in the die.

The preferred method may further include a step of locating a face member on at least one of the upper and lower surfaces of the mixture being fed into the intake zone and into the die whereby the face member is advanced through the intake zone and through the die. In one possible method, the face member remains attached to its associated surface of the bound body that emerges from the die after curing of the binder in the mixture within the die so that the face member forms a surface part of the bound body. In an alternative possible method, the face member is removed from the associated surface of the bound body after the bound body emerges from the die whereby the mixture within the die can be prevented by the removable face member from contacting and fouling the surfaces of the die.

Preferably the face member comprises a flexible sheet material progressively fed from a roll so as to enter the intake zone and progress to the die with the face sheet separating the mixture of particulate material and hinder from direct contact with the surfaces of the intake zone and die. The flexible sheet may be wider than the final width of the bound body that emerges from the die, and the flexible sheet may be shaped at its side edges to form side members for assisting to enclose the mixture in the die against lateral expansion.

The method may include the step of providing and locating a selectively replaceable wear sheet so as to extend completely through the intake zone and continuously through the die on a lower face thereof thereby, providing a sacrificial wear member protecting the faces of the intake zone and the die from abrasion and adhesion.

The invention also provides a bound body composed at least partially of particulate material when manufactured by a method according to the invention.

The invention also provides apparatus for manufacturing a bound body composed at least partially of particulate material, the apparatus comprising means operative to perform the steps of a method according to the invention.

According to a second particular aspect of the invention, there is provided an apparatus for manufacturing a bound body composed at least partially of particulate material, the apparatus comprising:

means for introducing to a feed material which includes a substantial proportion of particulate material a binder which includes a heat curable or activated adhesive substance so that the binder contacts significant proportions of the surfaces of the particulate material, a die having substantially the shape of a body to be produced and means for feeding the mixture of feed material having the binder therein into a die so that it adopts substantially the shape of the body to be produced, means for heating the mixture in the die until the hinder has cured sufficiently to enable further handling of the integral bound body comprising the bound particulate materials, and an intake zone into and through which the mixture is fed prior to entering the die and wherein the mixture is shaped into substantially the same shape it adopts when subsequently fed into the die so that any progress of curing of the binder due to heating the mixture resident in the intake zone is effective in curing binder while the mixture is in the desired final shape.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DESCRIPTION OF EMBODIMENTS OF THE INVENTION

Figure 3:
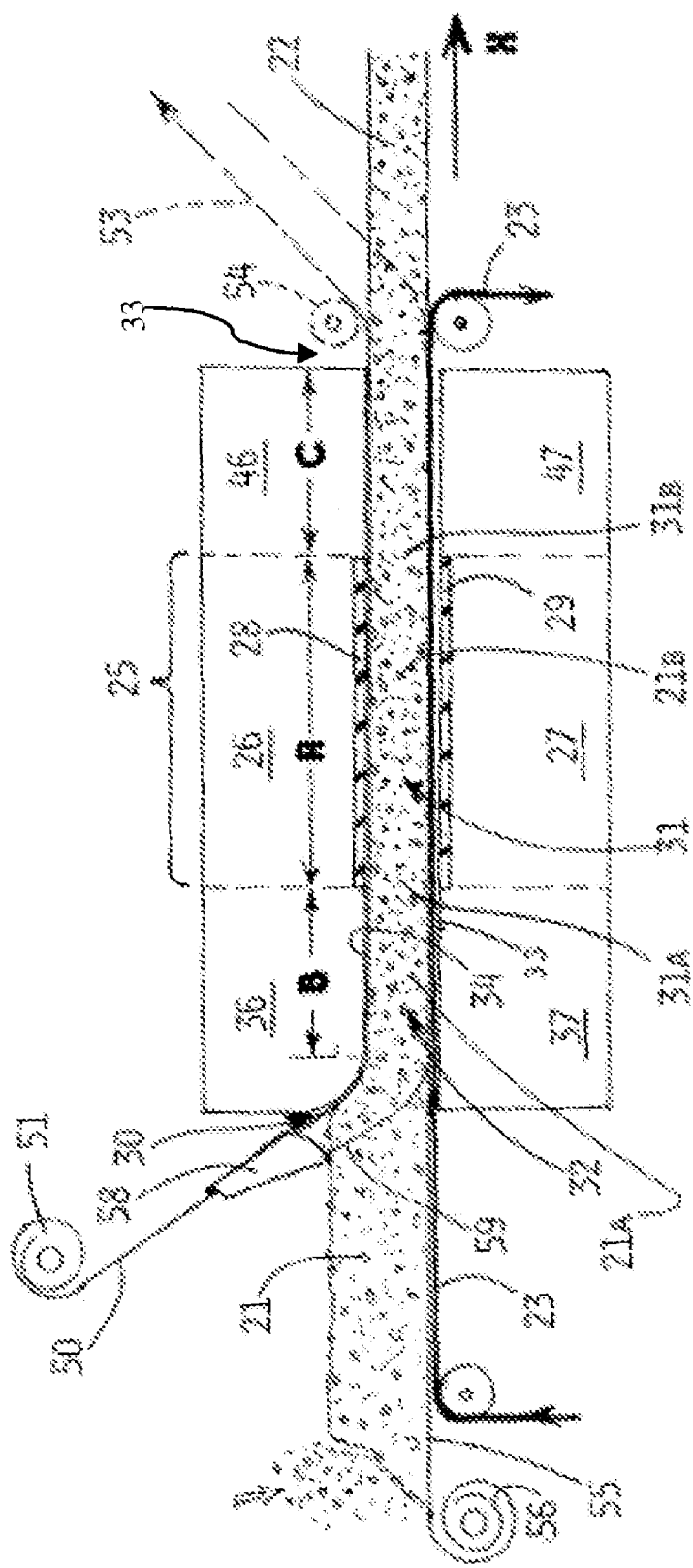
FIG. 3 is a schematic cross-section through an apparatus for producing a continuous panel embodying aspects of the present invention.

The bound body in FIG. 3 is a panel or board but the invention is not limited to this single product. For example continuous rods, beams, corrugated or other cross-sectional shaped bodies, arcuate pipe lagging, etc could be produced. The continuous bound body, panel, or formed shape can be made using any suitable particulate or fibrous materials, for example, wheat straw where the straw is preferably cut to a desired length and split or shaved or shredded (e.g. see U.S. Pat. No. 5,932,038 Bach et al. for wheat straw splitting or standing system), or any other straw or fibre, such as oat straw, rice straw, whole or comminuted rice hulls, or any cellulose or cellulosic or lignocellulosic materials agrifibres, cotton, synthetic organic fibres (e.g. rayon), inorganic fibres (e.g. glass or mineral fibres), including any products that can be mixed with a heat curing resin, or any combination or percentage thereof, including infills and re-inforcing materials. Other ingredients could include protective substances such as fire retardants, vermin deterrents, or insecticides. Layers of different materials can be laid for different physical, acoustic, thermal properties, and/or decorative aesthetic effects.

Radio frequency (RF) heating is preferred as the heating source to set or cure said resins or hinders. However the invention is not limited to RF heating and could be applicable to conductive beating using heated die plates, or heating by forcing heated fluid (e.g. air) through the mixture held in the die.

Any suitable resin that the setting or curing of resin is accelerated by or needs heat to set or cure, can be used. For example, MDI, pMDI type resins, a suitable resin is available from Huntsman Polyurethanes, is Suprasec 1041 binder.

Some types of MDI are water dispersible, set at about 80° C., and are useful for example with wheat straw which has a waxy surface.

Amongst the many problems encountered using a batch system for the high-frequency heating and curing of substrates, is the cumbersome and messy handling that arises by using this method. The moulds or dies need to be made with non-ferrous materials that have short working lives, and they are high maintenance items. Any product build up on the vertical side walls or between surfaces of the mould or die will increase the risk of what is termed "Flash Over" from live electrodes, and serious high frequency generator damage can result, especially with capacitors, transmitter valve (or tube), including high voltage transformers. This Flash Over has been known to render expensive high frequency generators totally inoperable, and at times unserviceable.

MDI and pMDI type resins will bond to the metal electrodes or die surfaces more so than other types of resins or binders, and providing separating layer or sheet or membrane, such as various types of paper, or coated papers, plastics sheet, including type films, or laminating sheet between the die plates and the resin-particulates substrate mixture tends to eliminate this problem. Waterproof membranes are preferred so the die is not wetted which can promote arcing (Flash Over). Release compounds are also available and useable, e.g. waxes sprayed onto the conveyor upstream of the die, but are more difficult to apply.

It is preferred to fold the sides of a bottom separating sheet upwards (e.g. using a guide like a "mould board" of a plough, and/or sides of a top separating sheet downwards, so as to enclose or encapsulate the substrate mixture and hold it more manageably through the die or press. If the separating sheet is in the form of a release film, it can be reclaimed or discarded once through the press. Alternatively, if desired, as well as separating the mixture from contacting the die surfaces the release film can become an integral part of the formed and bound body.

There are several problems with batch type moulding systems including:
(a) Loading and unloading dies and moulds, especially when high frequency heating is to used, because all moulds and dies must be made from non-metallic materials, and cleaning and maintaining them is very costly and frequently required. Also required when using batch systems are (i) the elaborate shuttle or traversing system to transport the dies or moulds into and through a press, (ii) the inefficient filling and emptying of the press moulds or dies, and (iii) the cleaning between usages.
(b) Difficulties in controlling uniform heat over and throughout large areas.
(c) The greater the area of a product becomes, the more difficult it is to tune the high frequency generator to the product, or match or tune the load to the generator.

Figure 1:
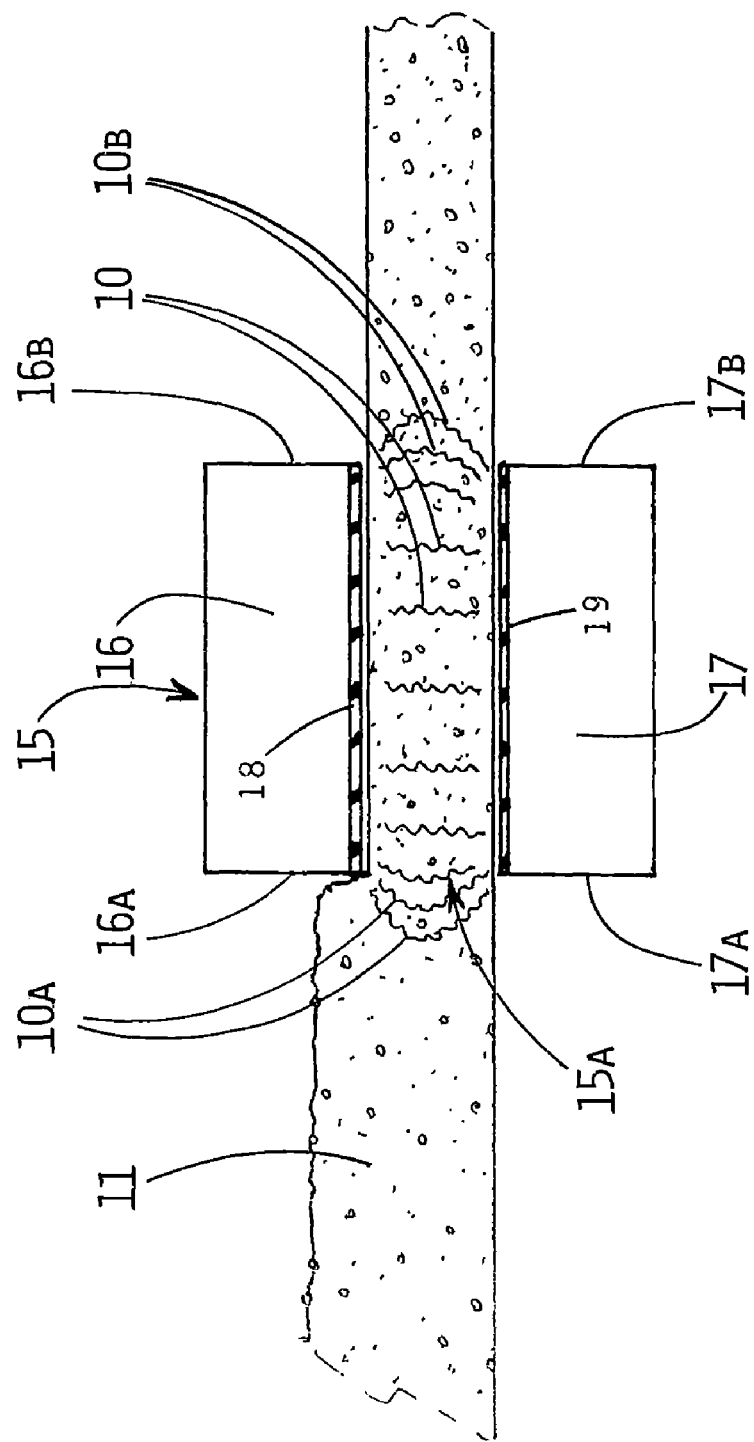
FIG. 1 is a schematic side sectional view of a die using RF energy to induce heating within a mixture of particulate material and binder in the die.
Figure 2:
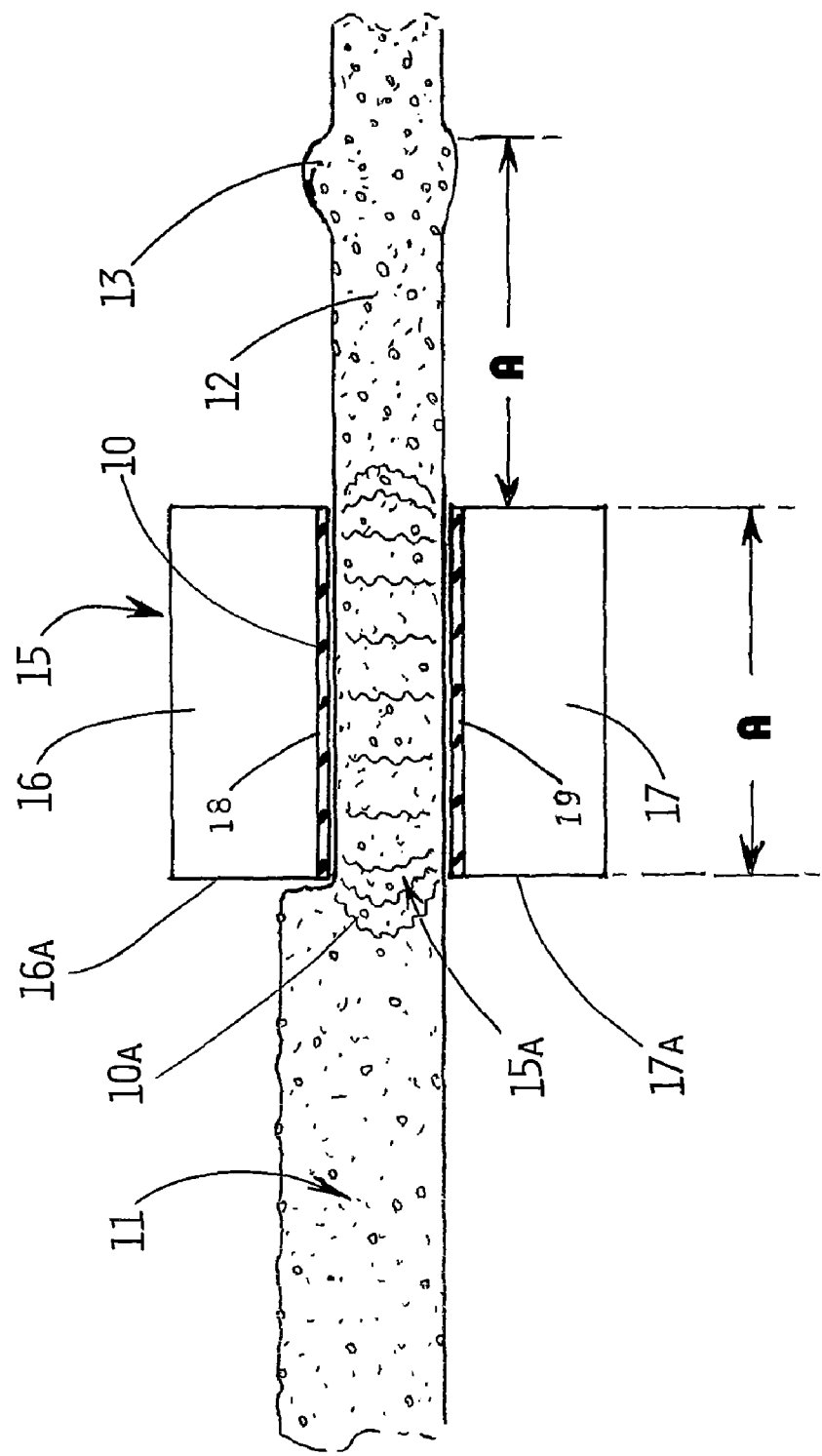
FIG. 2 is a simplified view of a problem that arises using the die of FIG. 1 to try to produce a continuous panel.

A problem or difficulty the inventor has discovered in producing a continuous board or panel, or other continuous shape using radio frequency as the heat source, is that the uncompressed upstream resin binder and particulates mixture (or substrate) 11, as shown in Fig. 1, i.e. the mixture 11 beyond or outside of the live electrodes 18; 19 of the die 15, is also heated up to at least approximately the same distance as the distance between the live electrodes 18, 19. This is illustrated in FIGS. 1 and 2 where the RF field 10 is shown at 10a extending beyond the edges 16a, 17a at the entrance 15a of the die 15 formed by top and bottom die members 16, 17. Hence the RF field 10a in use affects the mixture 11 outside of the entrance 15a of the die 15, thus initiating curing of the binder in the mixture 11 before it enters the die 15. This poses a serious problem, since the binder in the uncompressed mixture (substrate) 11 will be at least partially set or cured in that uncompressed condition. When that mixture (substrate) 11 is then indexed into, and placed under the compression in the die 15 and is held compressed therein to the desired thickness and density, and RF heating occurs between the live electrodes 18, 19, the binder that has been at least partially cured before entering the die 15 will have no effect on holding that part of the mixture (substrate) in a bound compressed condition, because the binder had already been set, or cured, in the uncompressed condition prior to entering the compression zone of the die 15 or press.

The panels or boards made in this manner, tended to expand as again shown schematically (and in an exaggerated manner) at 13 in FIG. 2 and tend to be weakened and snap of in sections equal in length to the feed indexing length of the mixture (substrate) 11 into the die (press) 15.

According to the embodiment of the invention as shown in FIG. 3, particulate and resin mixture 21 is formed and deposited on a conveyor 23, which may be a continuous belt, made of RF permeable material (e.g. canvas or other fabric, synthetic or natural rubber, polymer material, etc.). The conveyor 23 conveys the mixture 21 into a press or die 25 that, contains the live electrodes (plates) 28, 29. These constitute the top and bottom die members 26, 27 between which the mixture 21 is compressed e.g. by raising the top die member 26 to increase the separation during introduction of the mixture 21 in the longitudinal direction X, followed by return movement of the top die member 26 to compress the mixture 21 to a desired density. The top and bottom die members, 26, 27 16, 17 are shown as planar, but could have other shapes of profiles e.g. corrugated in the direction X. Compression ratios between about 2:1 and 4:1 produce relatively open-structured panels useful for acoustic or thermal insulation while compression ratios greater than about 4:1 produce higher density boards, like "craftwood", having more reflective properties and physical strength.

Between the live electrodes (plates) 28, 29 is the main curing zone 31 which is extended by an intake zone 32 upstream of the main curing zone 31 by intake guide portions 36, 37 composed of an insulating material. The intake zone 32 has opposing faces 33, 34 which are level with, and in the same plane as, the live electrodes 28, 29 and extends for a similar or preferably greater length B than the separation distance between the live electrodes 28, 29. Guide portions 36, 37 can be fixed to top and bottom die members 26, 27 so as to move therewith to open and close the die 25. The mixture or substrate 21 therefore will be held in the intake zone 32 in a compressed state the same as in the main curing zone 31 between the live electrodes 28, 29.

The mixture 21 is fed into the intake one 32 through a mouth 30 which has a progressively a narrowing shape advancing in the direction of X of the mixture 21 into the intake zone 32 so that the mixture 21 is progressively compressed as it is fed through the mouth 30 into the intake zone 32. Downstream of the mouth 30, the intake zone 32 may have very slightly diverging faces in the direction of advance to promote release and advance of the mixture 21 out of the intake zone 32 into the main curing zone 31.

An RF field is selectively applied through the live electrodes 28, 29 to dielectrically heat the water content of the binder in the mixture (substrate) 21b held and compressed in the main curing zone 31. In addition, because of some inductive or dielectric heating effect upstream of the entrance 31a and/or heat transfer through the mixture 21 (e.g. by heated air or steam migrating through the mixture 21) some of the substrate 21a can be at least partially set or cured beyond and upstream of the main curing zone 31 but under the same compression conditions as the mixture (substrate) 21 in the main curing zone 31 directly between the live electrodes 28, 29, although such curing will not occur in the total length B of the compressed substrate 21a held within the insulative extended press die section (the intake zone 32). This upstream compression to the same shape as the die shape provides an inventive and novel method of overcoming the problems of producing a continuous formed bound shape, using radio frequency as the heat source.

As panels of up to a thickness of 150 mm and beyond can be made using radio frequency, the extended insulative die length B upstream of the live electrodes 28, 29, can be anything up to 300 mm long, or even longer.

When the top die member 26 of the die 25 or press (and attached intake zone member 36) is raised, the portion of the substrate 21a that was compressed and the binder therein was partially set or cured upstream of the main curing zone 31 under the same compression and thickness as was the portion of the substrate 21b that was between the live electrodes 28, 29, is then moved forward into the main curing zone 31. This at least partially set or cured portion of the substrate 21a that was in the intake zone 32 and upstream of the entrance 3) of a main curing zone 31 will now be positioned between the live electrodes 28, 29 for ensuring complete curing. Preferably the portion of the substrate 21a is moved to a position under, and most preferably a little before the exit 31b of the main curing zone 31, (although effective binding may still be achieved if moved forward until a little after the exit 31b). Thus it will be possible to produce a continuous composite panel or board 22 using radio frequency field as a heating source.

Heating in the main curing zone 31 may be to about 80° C. for MDI and pMDI binders. Preferably the temperature is less than 100° C. so steam is not formed which can migrate upstream of the die 25 and dilute resin producing uncontrolled and non-uniform binding conditions.

It was also discovered that the sides of the mixture (substrate) 21 desirably needed support to achieve a uniform substrate density at least within the main curing zone 31. This can be achieved by the apparatus in FIG. 4, but with continued reference to FIG. 3, having side walls parallel to the direction X along at least the length A of the curing zone 31 and preferably along substantially the total length (A+B+C) of the die assemblies 36, 26, 46 and 37, 27, 47. These side walls 41, 42 can be moved out by suitable means 43 to allow a mixture (substrate) 21 to enter the main curing zone 31, then, when substrate forward indexing is complete, the side walls 41, 42 can be moved inward to the sides of the live electrodes 28, 29, holding substrate 21b level with side edges of the electrodes 28, 29, prior to compression, and therefore not allowing the mixture (substrate) to be squeezed laterally out of main curing zone 31, and be of a lower density than the centre of the mixture (substrate) 21. As shown schematically in FIG. 4 the bottom die member 27 is wider than the upper die member 26 and the side walls 41, 42 remain above the upper surface of the bottom die member to always confine the mixture 21 within the side walls 41, 42, but the top die member 26 moves down to fit closely between the side walls 41, 42.

The side walls 41, 42 can be moved laterally outward away from live electrodes 28, 29 to allow the substrate 21b that has set to form the bound body 22 to be indexed out through exit end 31b, e.g. into an exit zone 33 between insulating exit zone extension portions 46, 47 in which some residence time can allow curing, if not complete in zone 31, to progress further. The cycle then starts again. Instead of, or in addition to, lateral Movement of the side walls 41, 42, the side walls 41, 42 may diverge in the direction X of advance of the product, e.g. by a few degrees such as 1°-5° or say 5 mm over a die length A of 1200 mm, to promote release and advance of the formed and bound body 22 out of the main curing zone 31.

The substrate moisture level may determine if the side walls 41, 42 are held in against the edges of the live electrodes 28, 29, or slightly outwardly thereof, during the irradiation time. A slight outward positioning of the walls 41, 42 can reduce the risk of Flash Over at the sides of the die 25 particularly if moist binder is used.

Instead of side walls 41, 42 shown as side panels, endless belts with upright planes can form side walls and can be indexed together with the movement of the mixture (substrate) 21.

Face members 50, 55 are applied e.g. from rolls 51, 56, on the upper and lower surfaces of the mixture 21 being fed into the intake zone 32 and into the die 25 so that the face member 50, 55 are advanced through the intake zone and through the die 25. The face members 50, 55 remain attached to their associated upper and lower surfaces of the bound body 22 that emerges from the die 25 after curing of the binder in the mixture 21 within the die 25 so that the face members 50, 55 form surface parts of the bound body 22. Alternatively however, one or both face members 50, 55 can be removed from the associated surfaces of the bound body 22 after the bound body 22 emerges from the exit zone 33, as shown in FIG. 3 with trailing portion 53 of the upper face member 50 being peeled off the top surface around roller 54. By removing one or both the face members 50, 55, the mixture 21 within the die 25 can be prevented by the removable face members 50, 55 from contacting and fouling the facing surfaces of the die 25.

As shown, each face member 50, 55 comprises a flexible sheet material progressively fed from a roll 52, 56 so as to enter the intake zone 32 and progress to the die 25 with the face sheet separating the mixture 21 of particulate material and binder from direct contact with the surfaces of the intake zone 32 and die 25. As shown in FIG. 3 for the upper face member 50, the flexible sheet can be wider than the final width of the bound body 22 that emerges from the die 25, and the upper face member 50 is shaped by its side edges contacting shaping members 58, e.g. resembling a mould board of a plough, to be folded down and form side members 59 for assisting to enclose the mixture 21b in the die 25 against lateral expansion.

Figure 4:
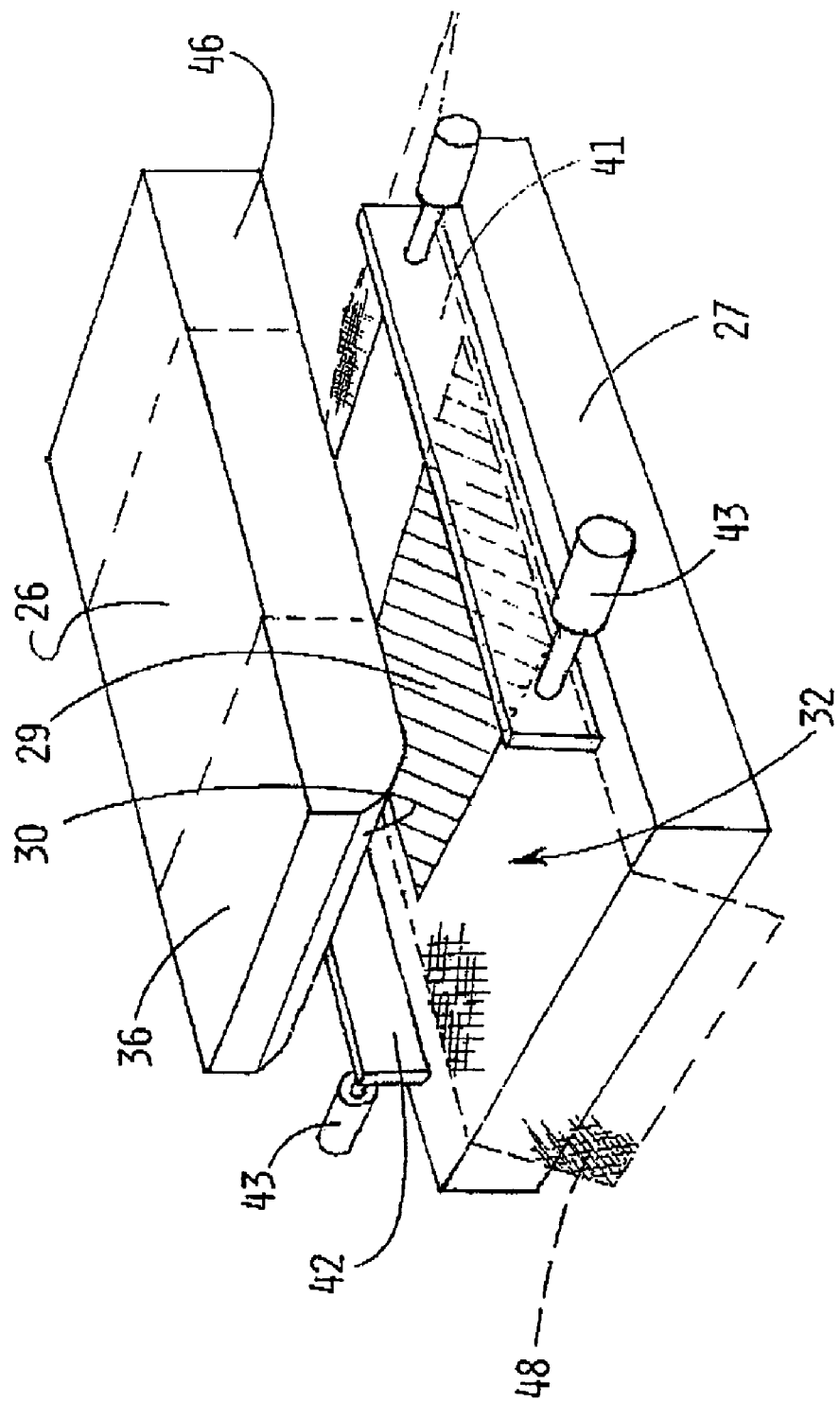
FIG. 4 is a schematic perspective view of aspects of the die used in the apparatus of FIG. 3.

FIG. 4 shows schematically a wear sheet 48 located so as to extend completely through the intake zone 32 and continuously through the die 25 on a lower face thereof thereby providing a sacrificial wear member protecting the faces of the intake zone 32 and the die 25 from abrasion.

It will be seen that in the preferred method and apparatus described herein the feeding of the mixture 21 in batches in an indexed manner from the intake zone 32 into the die 25 so that each batch of mixture 21a in the intake zone 32 is a continuous extension of the preceding batch of mixture 21b now in the main curing zone 31 of the die 25 so that the successive formed cured batches that are moved out of the die 25 form a continuous bound body 22 emerging in a stepped manner. In particular, the leading portion of the batch of mixture 21a in the intake zone 32 immediately upstream of the batch of mixture 21b in the die 25, and which is subject to at least some heating during heating of the mixture 21 in the die 25, is, upon being advanced into the die 25, located in the die 25 before the exit 31b of the die 25 so that it is substantially entirely resident in the die 25 for the heating cycle of its batch. That is, the longitudinal distance by which the mixture 21 is fed in each batch or indexing movement along the path from the intake zone 32 into the die 25 is less than the longitudinal length A of the die 25 in which heating of the substrate (mixture) 21b occurs, whereby all of the mixture 21 will experience a residence time completely within the longitudinal boundaries of the die 25.

The output of the apparatus is a continuous bound body or panel 22 without weakness or deformation or other flaw at any zone where the mixture 21 experienced some heating and curing outside of the die. Because of minor variations in composition or conditions in the forming and curing processes, particularly for low density panels, the top surface of the final bound body 22, or board, can have some minor height variations, in the order of about 1 mm, so the top may desirably be planed or sanded to produce a high quality flat surface finish.

The final products have been manufactured to satisfy safety standards e.g by having no free formaldehyde, and quality standards e.g. showing no swelling in both hot and cold water exposure tests, and no loss of internal bonding after water immersion tests.

The invention claimed is:

1. A manufacturing method for producing a bound body composed at least partially of particulate material, the method including the steps of:
   providing a feed material which includes a substantial proportion of particulate material,
   introducing to the feed material a binder which includes a heat curable or activated adhesive substance so that the binder contacts significant proportions of the surfaces of the particulate material,
   feeding a mixture of feed material having the binder therein into a die so that it adopts substantially a shape of a bound body to be produced, and
   heating the mixture in the die until the binder has cured sufficiently to enable further handling as an integral bound body comprising bound particulate materials,
   wherein the method includes the further step of feeding the mixture through an intake zone defined by intake guides composed of insulating material prior to entering the die which forms a continuous extension of the intake zone so that the mixture passes from the intake zone into the die without any intervening transition zone, the mixture being fed through the intake zone being shaped therein into substantially the same shape it adopts when subsequently fed into the die so that the mixture in the intake zone is a continuous extension of the mixture in the die and so that any progress of curing of the binder due to heating the mixture resident in the intake zone is effective in curing the binder while the mixture in the intake zone is in a desired final shape.

2. A method as claimed in claim 1 wherein the mixture of feed material and binder formed into the desired final shape is compressed in the die and is resident in a compressed condition in the die for a period of time for the binder to cure sufficiently to enable removal of the compression and handling of the bound body.

3. A method as claimed in claim 1 wherein the intake guides throughout their dimension in the feed direction have substantially the same profile and separation as the die.

4. A method as claimed in claim 1 wherein the heating comprises heating by RF energy applied through opposed conductive die plates between which the mixture is located and wherein the intake guides are composed of electrically insulating material.

5. A method as claimed in claim 1 wherein the mixture is fed into the intake zone through a mouth which has progressively a narrowing shape in the direction of advance of the mixture into the intake zone so that the mixture is progressively compressed as it is fed through the mouth into the intake zone.

6. A method as claimed in claim 1 wherein the die has side walls which confine the mixture laterally within the die during the heating of the mixture in the die.

7. A method as claimed in claim 6 wherein the side walls of the die slightly diverge in the direction of advance of the mixture through the die so as to promote the release of the bound body from the die at the end of each operation to cure the binder within the mixture in the die.

8. A method as claimed in claim 6 wherein the side walls of the die are movable towards each other to laterally confine the mixture in the die before commencement of the step of heating the mixture in the die and are movable apart to release the bound body formed by curing of the binder in the die.

9. A method as claimed in claim 1 and further including locating a face member on at least one of the upper and lower surfaces of the mixture being fed into the intake zone and into the die whereby the face member is advanced through the intake zone and through the die.

10. A method as claimed in claim 9 wherein the face member remains attached to its associated surface of the bound body that emerges from the die after curing of the binder in the mixture within the die so that the face member forms a surface part of the bound body.

11. A method as claimed in claim 9 wherein the face member is removed from the associated surface of the bound body after the bound body emerges from the die whereby the mixture within the die can be prevented by the removable face member from contacting and fouling the surfaces of the die.

12. A method as claimed in claim 9 wherein the face member comprises a flexible sheet material progressively fed from a roll so as to enter the intake zone and progress to the die with the face member separating the mixture of particulate material and binder from direct contact with the surfaces of the intake zone and the die.

13. A method as claimed in claim 1 wherein a selectively replaceable wear sheet is provided and located so as to extend completely through the intake zone and continuously through the die on a lower face thereof thereby providing a sacrificial wear member protecting the faces of the intake zone and the die from abrasion and adhesion.

14. A method as claimed in claim 4 wherein the length of the intake zone along which the mixture is fed before entering the die is at least equal to a separation distance of the die plates, whereby the length of the mixture shaped and resident in the intake zone is substantially equal to or greater than the distance between the die plates.

15. A method as claimed in claim 14 wherein the length of the intake zone along which the mixture is fed before entering the die is in the range of about 2 to 3 times the separation of the die plates.

16. A manufacturing method for producing a bound body composed at least partially of particulate material, the method including the steps of:
   providing a feed material which includes a substantial proportion of particulate material,
   introducing to the feed material a binder which includes a heat curable or activated adhesive substance so that the binder contacts significant proportions of the surfaces of the particulate material,
   feeding a mixture of feed material having the binder therein into a die so that it adopts substantially a shape of a body to be produced, and heating the mixture in the die until the binder has cured sufficiently to enable further handling as an integral bound body comprising bound particulate materials, wherein the method includes the further step of feeding the mixture through an intake zone prior to entering the die which forms a continuous extension of the intake zone so that the mixture passes from the intake zone into the die without any intervening transition zone, the mixture being fed through the intake zone being shaped therein into substantially the same shape it adopts when subsequently fed into the die so that the mixture in the intake zone is a continuous extension of mixture in the die and so that any progress of curing of the binder due to heating the mixture resident in the intake zone is effective in curing the binder while the mixture in the intake zone is in desired final shape, and wherein the step of feeding comprises feeding the mixture in batches in an indexed manner from the intake zone into the die so that each batch of the mixture in the intake zone is a continuous extension of the preceding batch now in the die and so that successive formed cured batches that are moved out of the die form a continuous body emerging in a stepped manner.

17. A method as claimed in claim 16 wherein a leading portion of the batch in the intake zone immediately upstream of the batch in the die and which is subject to at least some heating during heating of the mixture in the die is, upon being advanced into the die, located in the die before the exit of the die so that it is entirely resident in the die for the heating cycle of its batch.

18. A method as claimed in claim 16 wherein a longitudinal distance by which the mixture is fed in each batch or indexing movement along a path from the intake zone into the die is less than a longitudinal length of the die in which heating of the mixture occurs, whereby all of the mixture will experience a residence time completely within a longitudinal boundaries of the die.

19. A method as claimed in claim 16 wherein the die has side walls which confine the mixture laterally within the die during the heating of the mixture in the die.

20. A method as claimed in claim 19 wherein the side walls of the die slightly diverge in the direction of advance of the mixture through the die so as to promote the release of the bound body from the die at the end of each operation to cure the binder within the mixture in the die.

21. A method as claimed in claim 19 wherein the side walls of the die are movable towards each other to laterally confine the mixture in the die before commencement of the step of heating the mixture in the die and are movable apart to release the bound body formed by curing of the binder in the die.

22. A method as claimed in claim 16 and further including locating a face member on at least one of the upper and lower surfaces of the mixture being fed into the intake zone and into the die whereby the face member is advanced through the intake zone and through the die.

23. A method as claimed in claim 22 wherein the face member remains attached to its associated surface of the bound body that emerges from the die after curing of the binder in the mixture within the die so that the face member forms a surface part of the bound body.

24. A method as claimed in claim 22 wherein the face member is removed from the associated surface of the bound body after the bound body emerges from the die whereby the mixture within the die can be prevented by the removable face member from contacting and fouling the surfaces of the die.

25. A method as claimed in claim 22 wherein the face member comprises a flexible sheet material progressively fed from a roll so as to enter the intake zone and progress to the die with the face member separating the mixture of particulate material and binder from direct contact with the surfaces of the intake zone and the die.

26. A method as claimed in claim 16 wherein a selectively replaceable wear sheet is provided and located so as to extend completely through the intake zone and continuously through the die on a lower face thereof thereby providing a sacrificial wear member protecting the faces of the intake zone and the die from abrasion and adhesion.

27. A manufacturing method for producing a bound body composed at least partially of particulate material, the method including the steps of:

providing a feed material which includes a substantial proportion of particulate material, introducing to the feed material a binder which includes a heat curable or activated adhesive substance so that the binder contacts significant proportions of the surfaces of the particulate material, feeding a mixture of feed material having the binder therein into a die so that it adopts substantially a shape of a bound body to be produced, heating the mixture in the die until the binder has cured sufficiently to enable further handling as an integral bound body comprising bound particulate materials, feeding the mixture through an intake zone prior to entering the die which forms a continuous extension of the intake zone so that the mixture passes from the intake zone into the die without any intervening transition zone, the mixture being fed through the intake zone being shaped therein into substantially the same shape it adopts when subsequently fed into the die so that the mixture in the intake zone is a continuous extension of the mixture in the die and so that any progress of curing of the binder due to heating the mixture resident in the intake zone is effective in curing the binder while the mixture in the intake zone is in a desired final shape, locating a face member on at least one of the upper and lower surfaces of the mixture being fed into the intake zone and into the die whereby the face member is advanced through the intake zone and through the die, the face member comprising a flexible sheet progressively fed from a roll so as to enter the intake zone and progress to the die with the face member separating the mixture of particulate material and binder from direct contact with the surfaces of the intake zone and the die, wherein the flexible sheet is wider than the final width of the bound body that emerges from the die, and wherein the flexible sheet is shaped at its side edges to form side members for assisting to enclose the mixture in the die against lateral expansion.

28. Apparatus for manufacturing a bound body composed at least partially of particulate material, the apparatus comprising:

means for introducing to a feed material which includes a substantial proportion of particulate material a binder which includes a heat curable or activated adhesive substance so that the binder contacts significant proportions of the surfaces of the particulate material, a die having substantially the shape of a body to be produced and means for feeding a mixture of the feed material having the binder therein into the die so that it adopts substantially the shape of the body to be produced, means for heating the mixture in the die until the binder has cured sufficiently to enable further handling of the integral bound body comprising bound particulate materials, and an intake zone into and through which the mixture is fed prior to entering the die, the die being configured to form a continuous extension of the intake zone so that the mixture passes from the intake zone into the die without any intervening transition zone, the mixture being fed through the intake zone being shaped therein into substantially the same shape it adopts when subsequently fed into the die so that the mixture in the intake zone is a continuous extension of mixture in the die so that any progress of curing of the binder due to heating the mixture resident in the intake zone is effective in curing the binder while the mixture in the intake zone is in a desired final shape, wherein the apparatus further includes one or more of the following features:

the means for feeding is configured to feed the mixture in batches in an indexed manner from the intake zone into the die so that each batch of the mixture in the intake zone is a continuous extension of a preceding batch now in the die and so that successive formed cured batches that are moved out of the die form a continuous body emerging in a stepped manner;

the intake zone is defined by intake guides composed of insulating material; and a supply of a flexible sheet is associated with the intake zone in a manner that enables the flexible sheet to enter the intake zone and progress to the die, with the flexible sheet separating the mixture of particulate material and binder from direct contact with the surfaces of the intake zone and the die, wherein the flexible sheet is wider than the final width of the bound body that emerges from the die, and wherein the flexible sheet is shaped at its side edges to form side members for assisting to enclose the mixture in the die against lateral expansion.

* * * * *